United States Patent [19]

Hall

[11] 4,401,800

[45] Aug. 30, 1983

[54] LITHIUM ALKOXIDE DIAMINES AS MODIFIERS FOR POLYMERIZATION OF DIENES USING LITHIUM-BASED INITIATORS

[75] Inventor: James E. Hall, Akron, Ohio

[73] Assignee: The Firestone Tire & Rubber Company, Akron, Ohio

[21] Appl. No.: 388,347

[22] Filed: Jun. 14, 1982

[51] Int. Cl.$^3$ .......................... C08F 4/48; C08F 36/06
[52] U.S. Cl. ................................ 526/175; 252/431 L; 526/335
[58] Field of Search ..................... 526/175; 252/431 L

[56] References Cited

U.S. PATENT DOCUMENTS 4,129,705 12/1978 De Zarauz ........................... 526/175
4,238,588 12/1980 Lochman et al. .................... 526/175
4,247,418 1/1981 Halasa et al. ..................... 252/431 L

FOREIGN PATENT DOCUMENTS 2139886 2/1972 Fed. Rep. of Germany ... 252/431 L

OTHER PUBLICATIONS

Chem. Abstracts vol. 95 25725q, Halasa et al.

*Primary Examiner*—Joseph L. Schofer
*Assistant Examiner*—Peter F. Kulkosky

[57] ABSTRACT

A process and catalyst system is disclosed herein for the preparation of (co)polymers having a 1,2-microstructure of between 20 and 90 percent. These (co)polymers are prepared in a hydrocarbon or non-polar solvent from a monomer system which contains at least one 1,3-diene monomer. The catalyst system which is employed in the production of the (co)polymers of the present invention is a combination of a chelated lithium alkoxide diamine modifier and an anionic initiator based on lithium.

14 Claims, No Drawings

LITHIUM ALKOXIDE DIAMINES AS MODIFIERS FOR POLYMERIZATION OF DIENES USING LITHIUM-BASED INITIATORS

BACKGROUND OF THE INVENTION

It has previously been disclosed in U.S. Pat. No. 3,451,988, to Langer, to use an organolithium compound such as n-butyl lithium with a chelating bifunctional Lewis base such as tetramethyl ethylene diamine (TMEDA) as a catalyst for polymerizing ethylene and homopolymerizing or copolymerizing diolefins having increased ratios of 1,2-structure.

The present invention utilizes a catalyst system comprised of an anionic initiator based on lithium and a modifier compound which contains a lithium alkoxide and a tertiary diamine in one molecule in the form of a chelate. The present catalyst system has increased stability at higher temperatures than does the prior art catalyst systems which employ chelated diamines. This increased stability allows for more economical production of homopolymers and copolymers of medium-vinyl diolefins at higher polymerization temperatures.

SUMMARY OF THE INVENTION

A process and catalyst system is disclosed herein for the preparation of (co)polymers containing a 1,2-microstructure of between about twenty (20) and about ninety (90) percent. These (co)polymers are prepared in an inert non-polar solvent such as a hydrocarbon solvent from a monomer system which contains at least one 1,3-diene monomer. The catalyst system which is employed in the production of the (co)polymer is an anionic initiator based on lithium and a chelated lithium alkoxide diamine modifier formed from a lithium compound and a hydroxy or ketone group containing diamine.

DETAILED DESCRIPTION OF THE INVENTION

The process of the present invention for the preparation of medium vinyl polybutadiene or other (co)polymers formed from at least one 1,3-diene produces a polymer which has a 1,2-microstructure ranging between about twenty (20) and ninety (90) percent in the 1,3-diene monomer contributed units.

The polymerization catalyst which is used in the present invention is a combination of (1) a chelated lithium alkoxide diamine modifier formed from lithium compound and a hydroxy or ketone group containing diamine modifier, and (2) an anionic initiator based on lithium.

Monomer System

The catalyst system of the present invention is used in preparing (co)polymers having an increased vinyl content in the 1,3-diene monomers contributed units. Polymerizable 1,3-dienes employed in the production of the polymers of the present invention are 1,3-conjugated dienes containing from four to twelve, inclusive, carbon atoms per molecule. Examples thereof include the following: 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene; and the like. Among the dialkyl-butadienes, it is preferred that the alkyl groups contain from one to three carbon atoms. Numerous others are disclosed, for instance, in U.S. Pat. No. 3,377,404, the disclosure with respect to which is incorporated herein by reference. The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Comonomers of different 1,3-diene monomers can be combined in any proportion. The term (co)polymer is defined herein as either a homopolymer or a copolymer formed from at least one diene monomer and optionally one or more copolymerizable monomer.

In addition to the above described conjugated dienes, one or more suitable copolymerizable monomers such as vinyl-substituted aromatic monomers can be incorporated into the polymerization mixture. Examples of suitable copolymerizable monomers for use in the preparation of copolymers in the present invention include: styrene; alpha-methylstyrene; 1-vinylnaphthalene; 2-vinylnaphthalene; 1-alpha-methylvinylnaphthalene; 2-alpha-methylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distyrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constitutes generally not greater than 12. Examples of these latter compounds include: 3-methylstyrene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyl-toluene. Again, reference is made to U.S. Pat. No. 3,377,404 for disclosures of additional vinyl-substituted aromatic compounds which are incorporated herein by reference.

When a comonomer system employs one or more copolymerizable monomers other than a 1,3-diene monomer, generally at least one percent preferably at least five percent by weight of the copolymerizable monomers should be used and as much as sixty percent, preferably no more than forty percent may be used.

The solvent polymerization takes place in inert organic diluents, in which the monomer, anionic initiator and lithium alkoxide diamine modifier are soluble. The anionic initiator may not be soluble in these solvents in some instances. Many suitable inert diluents are known in the art and those diluents generally preferred are alkanes, or other non-polar solvents. Suitable diluents include but are not limited to ethane, propane, iso- and n-butane, iso- and n-pentane, iso- and n-hexane, iso- and n-heptane, iso- and n-octane, cyclobutane, cyclopentane, cyclohexane, cycloheptane, cyclooctane; benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction.

The concentration of monomer in solvent ranges from 2 to 50 wt. percent or more and is generally dependent upon economics and the ability to control reaction conditions and to handle the polymer solution. The use of monomer concentrations ranging from between 15 to 25 wt. percent is generally practical.

Catalyst System

The catalyst system employed in the present invention is a combination of (1) a chelated lithium alkoxy diamine modifier, and (2) an anionic initiator based on lithium. The chelated lithium alkoxide diamine modifier is formed by reacting a lithium compound with a hydroxy or ketone group containing diamine compound. The lithium compound used in forming the lithium alkoxide diamine modifier can be the same compound as the anionic initiator based on lithium. In such instances the lithium compound (anionic initiator based on lithium) is used in a reactive excess of the hydroxy or ketone group containing diamine to produce a catalytically effective amount of a catalyst system containing a chelated lithium alkoxide diamine modifier and an anionic initiator based on lithium.

The anionic initiators based on lithium which can be used in reactive excess to produce a chelated lithium alkoxide diamine modifier and to initiate polymerization of the monomer system include suitable organolithium catalysts which have the formula $R(Li)_{x''}$ wherein R represents a hydrocarbyl radical of 1 to 20, preferably 2–8, carbon atoms per R group, and $x''$ is an integer of 1-4. Typical R groups include aliphatic radicals and cycloaliphatic radicals such as alkyl, cycloalkyl, cycloalkylalkyl, alkylcycloalkyl, aryl and alkylaryl radicals.

Specific examples of R groups for substitution in the above formula include primary, secondary, and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include:

phenyllithium, naphthyllithium, 4-butylphenyllithium, p-tolyllithium, 4-phenylbutyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Other lithium catalysts which can be employed as initiators but not for the preparation of the lithium alkoxide modifiers are lithium dialkyl amines, lithium dialkyl phosphines, lithium alkyl aryl phosphines, lithium diaryl phosphines and lithium catalyst having the formula $RO(Li)_{x''}$ wherein R is defined above.

Mixtures of different lithium catalysts can also be employed such as one or more lithium compounds such as $R(Li)_{x''}$ which may be used to form diamine modifiers in combination with none, one or more anionic initiators based on lithium which do not form lithium alkoxide diamine chelates. The preferred lithium catalysts for use in the present invention is n-butyllithium.

The hydroxy or ketone group containing diamine compounds which are employed to produce lithium alkoxide diamine modifiers which are employed in the present invention are represented by formula (I) and formula (II):

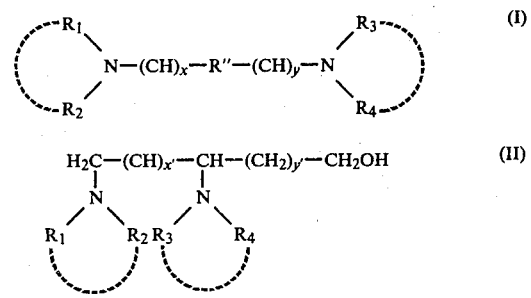

wherein x and y are the same or different and are 1 or 2; $x'$ and $y'$ independently are 0, 1 or 2, but both $x'$ and $y'$ are not 0; $R''$ is either —CH(OH)— or —C(O)—; and $R_1$, $R_2$, $R_3$ and $R_4$ are the same or different and are alkyl radicals of 1 to 3 carbon atoms inclusive, or $R_1$ and $R_2$ or $R_3$ and $R_4$ may be taken together to form a ring structure with the amino nitrogen atom preferably a five membered hetero ring such as pyrrolidine.

These hydroxy group containing diamine modifiers are typically prepared by reacting corresponding secondary amines with an appropriate dichloroalkanol in the presence of a base, for example, NaOH in water. Other prepatory routes can be employed. Ketone group containing diamine modifiers can be prepared through the use of a Mannich reaction which is well known in the art.

Suitable examples of the hydroxy or ketone group containing diamine modifiers include: 1,3-tetramethyldiamine-2-propanol, 2,3-tetramethyldiamine-1-propanol, 1,3-dipyrrolidine-2-propanol, 2,3-dipyrrolidine-1-propanol, 1,5-tetramethyldiamine-3-pentone, 1,5-tetramethyldiamine-3-pentanol, 1,4-tetramethyldiamine-3-butanol, 1,4-tetramethyldiamine-3-butanone, and the like. Preferred diamine modifiers are apparent from the preferred chelated lithium alkoxide diamines listed later.

The molar ratio of the lithium alkoxide diamine modifier to the anionic initiator can vary from 1.0/10.0 to 10.0/1.0, preferably from 1.0/1.0 to 2.0/1.0.

The chelated lithium alkoxide diamine used as catalysts in the present invention are prepared upon mixture of the anionic initiator and the diamine modifier and can be formed in-situ with the monomer charge or can be pre-made and added to the monomer system. Mixtures of different diamine modifiers can also be employed to form the chelated lithium alkoxide diamines.

Suitable examples of the chelated lithium alkoxide diamines which can be employed in the present invention include: lithium, 1,3-tetramethyldiamine-2-propanoxide, lithium 2,3-tetramethyldiamine-1-propanoxide, lithium 1,3-dipyrrolidine-2-propanoxide, lithium 2,3-dipyrrolidine-1-propanoxide, lithium 1,5-tetramethyldiamine-3-pentanoxide, lithium 1,4-tetramethyldiamine-3-butanoxide, lithium 1,3-tetraethyldiamine-2-propanoxide and the like. The preferred lithium alkoxide diamines for use with the present invention are lithium 1,3-dipyrrolidine-2-propanoxide, lithium 2,3-dipyrrolidine-1-propanoxide and lithium 1,3-tetramethyldiamine-2-propanoxide.

The anionic lithium initiators of the present invention are employed in catalytically effective amounts designed to result in the desired molecular weight. For example, a polybutadiene of 100,000 $\overline{M}_n$ would be prepared by charging enough active lithium to react with impurities plus 1.0 mmole of lithium per one hundred grams of 1,3-butadiene. Polymers of from 1,000 $\overline{M}_n$ to 500,000 $\overline{M}_n$ can be readily made by one skilled in this technology.

The catalytically effective amount of moles of anionic initiator in excess of any lithium contained in the lithium alkoxide diamine modifier per hundred grams of monomer for use in the present invention ranges between 0.2 millimoles to 100 millimoles, preferably 0.3 millimoles to 3.0 millimoles, most preferably 1.0 millimoles to 2.0 millimoles of anionic initiator based on lithium per hundred grams of monomer.

The amount of lithium alkoxide diamine, as well as the ratio of the diamine modifier to the anionic initiator, employed in producing the (co)polymers of the present invention determine the individual content of 1,2-microstructure in the 1,3-diene (co)polymer finally produced. It has been determined that the 1,3-diene (co)polymers produced according to the process of this invention should have a vinyl content ranging between about twenty (20) to about ninety (90) percent 1,2-microstructure in the 1,3-diene monomer contributed units.

All amounts of anionic initiators and lithium alkoxide diamine modifiers as indicated by moles per grams of monomer or by ratio of components in the instant invention are considered to be catalytically effective amounts, that is, effective amounts for initiating and conducting polymerization of the disclosed monomer systems to produce a (co)polymer containing a 1,2-microstructure ranging between about 20 to 90 percent in the 1,3-diene monomer contributed units.

Process conditions such as the starting temperature of the polymerization reaction and the ratio of monomer to diluent independently effect the final 1,2-microstructure content of the 1,3-diene (co)polymers. These conditions can be controlled for each monomer reaction system to produce the final desired 1,2-microstructure content of from about twenty (20) to about ninety (90) percent. It is desirable to produce polymers and copolymers having a 1,2-microstructure between 35 and 55 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in this connection the term adiabatic polymerization means that heat is neither supplied or removed during the course of polymerization.

The present polymerization system is applicable to solution polymerization techniques which are conducted at temperatures of 0° C. to 160° C., preferably 90° to 160° C. Reaction temperature below 90° C. temperature range normally produce (co)polymers containing a very high 1,2-microstructure, for example, between 70 and 90 percent of a 1,2-microstructure. Reaction temperatures between 90° and 160° C. generally produce (co)polymers containing between 20 and 70 percent of a 1,2-microstructure. Any temperature in this range of 0° C. to 160° C. which gives a convenient polymerization rate while producing a (co)polymer having a 1,2-microstructure ranging between 20 and 90 percent is acceptable. If the operation is to be conducted as a batch operation, initiation temperatures of from 0° C. to 90° C. are preferred. If the operation is to be a continuous operation, slightly higher initiation temperatures are employed, such as 100° C. to 120° C., and it is preferred that the polymerization process be maintained in a range of from 90° C. to 160° C., most preferably 115° C. to 130° C.

The polymerization reaction can be performed at pressures between 0.5 to 100 atmospheres. When the desired degree of polymerization has been reached, the (co)polymer can be isolated by precipitation with a non-solvent such as methanol, isopropanol or water. Alternatively, the solution can be injected into the slurry tank containing a hot non-solvent whereupon the solvent is flashed off and the (co)polymer remains as a slurry with the non-solvent. Alternatively, the solvent can be removed directly by the application of heat and/or flashing to a lower pressure.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. The mean average molecular weight of the final (co)polymer produced can range from 1,000 to 500,000. These (co)polymers depending on their molecular weight and composition can be used for a variety of applications ranging from molding materials, rubber goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention.

EXAMPLE 1

A one gallon stainless steel reactor equipped with a stirrer blade is charged with 340 grams of 1,3-butadiene monomer in 1360 grams of n-hexane and 4.0 millimoles of 1,3-dipyrrolidine-2-propanol and the temperature is adjusted to 120° C. 8.0 Millimoles of n-butyllithium is added to the mixture in the reaction vessel thus producing a 1/1 mole ratio of RLi/Li alkoxide diamine. Polymerization is completed within 60 minutes and the reaction temperature is maintained at 120° C. After termination of the reaction, 0.5 percent by weight of an antioxidant, ditert-butyl-p-cresol ("IONOL"), based on the butadiene mixture is added to the mixture which is coagulated in isopropanol and drum dried to remove the solids. The product polybutadiene contains 53.0 percent of 1,2-microstructure as determined by IR spectroscopy. The polymerization product represented an 86 percent conversion of monomer to polymer.

EXAMPLE 2

In accordance with the procedures of Example 1, a charge of 340 grams of 1,3-butadiene monomer in 1360 grams of n-hexane, 7.0 millimoles of n-butyllithium and 4.5 millimoles of 1,3-dipyrrolidine-2-propanol are reacted at a temperature initiated and maintained at 130° C. for a period of two hours. The product polybutadiene contains 54.0 percent of 1,2-microstructure and a mean molecular weight ($\overline{M}_n$) of 52,000 as determined by gel permeation chromatography (G.P.C.). The ratio of weight average molecular weight ($\overline{M}_w$) to $\overline{M}_n$ is 1.64.

EXAMPLE 3

In accordance with the procedures of Example 1, a charge of 340 grams of 1,3-butadiene in 1360 grams of n-hexane, 6.0 millimoles of n-butyllithium and 4.0 millimoles of 1,3-dipyrrolidine-2-propanol are reacted at a temperature initiated and maintained at 120° C. for a period of 1½ hours. Completed reaction product displays a 76 percent conversion of monomer to polymer. The product polybutadiene contains 64.4 percent of a 1,2-microstructure. The $\overline{M}_n$ of the product polybutadiene is 80,600 and $\overline{M}_w/\overline{M}_n$ is 1.46.

EXAMPLES 4 THROUGH 11

The reaction conditions of Examples 4 through 11 and the properties of the polymers thus obtained are set forth in Table 1. In all examples polymerization reactions are conducted at temperatures at or below 80° C., thus producing polybutadiene polymers exhibiting 1,2-microstructure contents exceeding 65 percent. All lithium alkoxide diamines were produced by reacting an excess of n-BuLi with the corresponding substituted propanol. The amount of n-butyl-lithium in millimoles listed in Table 1 represents the excess amount used in the reaction. Thus, in Example 4, 0.75 millimoles of n-butyl-lithium is the amount of anionic initiator while an additional 0.75 millimoles of n-butyl-lithium was reacted with the 0.75 millimoles of the diamine propanol to form 0.75 millimoles of the lithium alkoxide diamine modifier.

EXAMPLE 12

In accordance with the procedures of Example 1, a charge of 570 grams of butadiene monomer in 1710 grams of n-hexane, 7.0 millimoles of n-butyllithium and 3.5 millimoles of 2,3-dipyrrolidine-1-propanol are reacted at a temperature initiated and maintained at 135° C. for a period of 2½ hours. The reaction product exhibits a monomer to polymer conversion rate of 83 percent. The polybutadiene product contains 37.1 percent of 1,2-microstructure.

EXAMPLES 13 THROUGH 16

The reaction conditions of Examples 13 through 16 and the properties of the polymers thus obtained are set forth in Table 1. In all examples polymerization reactions are conducted at temperatures at or below 80° C. thus producing polybutadiene polymers exhibiting 1,2-microstructure contents exceeding 65 percent.

From the foregoing description, one skilled in the art can easily ascertain the essential characteristics of this invention, and without departing from the spirit and scope thereof, can make various changes and modifications of the invention to adapt it to various usages and conditions.

I claim:

1. A catalyst system comprising:
   (a) at least one anionic initiator based on lithium, and
   (b) at least one lithium alkoxide diamine chelate formed by mixing
      (i) at least one lithium compound of the formula $R(Li)_{x''}$ wherein R represents a hydrocarbyl radical of 1 to 20 carbon atoms and $x''$ is an integer of 1 to 4, and
      (ii) at least one hydroxy or ketone group containing diamine selected from the group consisting of the following structural formulas:

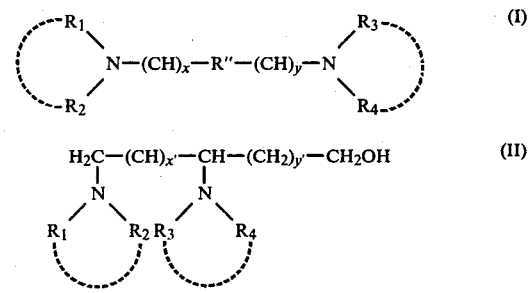

TABLE 1

| | Reaction Condition | | | | | Polymer Properties | | | |
|---|---|---|---|---|---|---|---|---|---|
| Example No. | 1,3-Butadiene[1] Parts by Weight (Grams) | n-Butyl-Lithium Millimoles | Lithium Diamine Modifier Millimoles | Poly.[4] Temp. (°C.) | Poly.[5] React. Tm. (Hrs) | 1,2-Microstructure Percent | $\overline{M}_n$ | $\overline{M}_w/\overline{M}_n$ | Conversion Monomer to Polymer Percent |
| 4 | 25 (66) | 0.75 | 0.75[2] | 5 | 19 | 82.8 | 118,800 | 1.103 | 80 |
| 5 | 25 (67) | 0.75 | 0.75[2] | 30 | 19 | 78.9 | 137,800 | 1.128 | 87 |
| 6 | 25 (63) | 0.75 | 0.75[2] | 50 | 16 | 73.5 | 124,200 | 1.166 | 96 |
| 7 | 25 (64) | 0.75 | 0.75[2] | 80 | 16 | 68.6 | 123,000 | 1.243 | 93 |
| 8 | 25 (67) | 0.75 | 1.5[2] | 5 | 19 | 81.6 | 139,500 | 1.116 | 92 |
| 9 | 25 (66) | 0.75 | 1.5[2] | 30 | 19 | 80.4 | 129,200 | 1.132 | 97 |
| 10 | 25 (66) | 0.75 | 1.5[2] | 50 | 16 | 77.1 | 115,000 | 1.170 | 97 |
| 11 | 25 (65) | 0.75 | 1.5[2] | 80 | 16 | 72.6 | 106,100 | 1.188 | 96 |
| 13 | 25 (66) | 0.5 | 0.5[3] | 5 | 23 | 80.7 | 99,300 | 1.219 | 44 |
| 14 | 25 (65) | 0.5 | 0.5[3] | 30 | 23 | 71.1 | 105,700 | 1.220 | 79 |
| 15 | 25 (63) | 0.5 | 0.5[3] | 50 | 19 | 73.3 | 188,700 | 1.259 | 88 |
| 16 | 25 (570) | 4.1 | 4.1[3] | 80 | 6 | 67.3 | 107,000 | 1.720 | 80 |

[1]In 75 parts by weight n-hexane
[2]Lithium alkoxide of 1,3-dipyrrolidine-2-propanol
[3]Lithium alkoxide of 2,3-dipyrrolidine-1-propanol
[4]Polymerization Temperature (°C.)
[5]Polymerization Reaction Time (Hours)

wherein x and y are the same or different and are 1 or 2; x' and y' independently are 0, 1 or 2; R" represents —CH(OH)— or —C(O)—; and $R_1$, $R_2$, $R_3$ and $R_4$ are the same or different and are alkyl radicals of 1 to 3 carbon atoms inclusive, or $R_1$ and $R_2$, and $R_3$ and $R_4$ are joined together to form a five member heterocyclic ring structure.

2. The catalyst system of claim 1 wherein the anionic initiator (a) and the lithium compound (i) are n-butyllithium.

3. The catalyst system of claim 1 wherein the hydroxy containing diamine is 1,3-dipyrrolidine-2-propanol.

4. The catalyst system of claim 1 wherein the hydroxy containing diamine is 2,3-dipyrrolidine-1-propanol.

5. The catalyst system of claim 1 wherein the hydroxy containing diamine is 1,3-tetramethyldiamine-2-propanol.

6. A process for the preparation of a polymer by polymerizing:
(A) 40 to 100 percent of at least one 1,3-diene monomer, and
(B) 0 to 60 percent of one or more reactive monomers which are copolymerizable with said 1,3-diene monomers,
in an inert non-polar solvent in the presence of a catalytically effective amount of a catalyst system comprising:
(a) at least one anionic initiator based on lithium, and
(b) a lithium alkoxide diamine chelate catalyst formed from a mixture of:
(i) at least one lithium compound of the formula $R(Li)_{x''}$ wherein R represents a hydrocarbyl radical of 1 to 20 carbon atoms and x" is an integer of 1 to 4, and
(ii) at least one hydroxy or ketone group containing diamine selected from the group consisting of the following structural formulas:

(i)
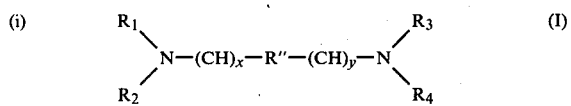
(I)

(ii)
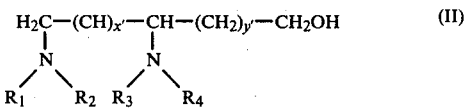
(II)

wherein x and y are the same or different and are 1 or 2, and x' and y' independently are 0, 1 or 2; R" represents —CH(OH)— or —C(O)—; and $R_1$, $R_2$, $R_3$ and $R_4$ wherein at least one of x' and y' is other than 0 are the same or different and are alkyl radicals of 1 to 3 carbon atoms inclusive, or $R_1$ and $R_2$ and $R_3$ and $R_4$ are joined together to form a five member heterocyclic ring structure,
in which the molar ratio of the anionic initiator (a) to the lithium alkoxide diamine modifier (b) ranges between about 10.0/1.0 to about 1.0/10.0, the millimoles of the anionic initiator per 100 grams of the (A+B) monomers ranges between about 0.2 and about 100, the polymerization temperature is maintained between about 0° C. and 160° C., wherein said polymer contains a 1,2-microstructure in the 1,3-diene monomer contributed units ranging between 20 and 90 percent.

7. The process as in claim 6 wherein the 1,3-diene is a butadiene.

8. The process as in claim 6 wherein the 1,3-diene is butadiene and the reactive monomer is styrene.

9. The process as in claim 6 wherein the anionic initiator (a) and the lithium compound (i) are n-butyllithium.

10. The process as in claim 6 wherein the hydroxy containing diamine is 1,3-dipyrrolidine-2-propanol.

11. The process as in claim 6 wherein the hydroxy containing diamine is 2,3-dipyrrolidine-1-propanol.

12. The process as in claim 6 wherein the hydroxy containing diamine is 1,3-tetramethyldiamine-2-propanol.

13. The process as in claim 6 wherein the polymer has a 1,2-microstructure ranging between 35 and 55 percent.

14. The process as in claim 6 wherein the polymerization temperature is maintained between 115° C. and 130° C.

* * * * *